No. 890,260. PATENTED JUNE 9, 1908.
T. B. CATLETT.
COTTON CHOPPER.
APPLICATION FILED MAY 20, 1907.
2 SHEETS—SHEET 1.
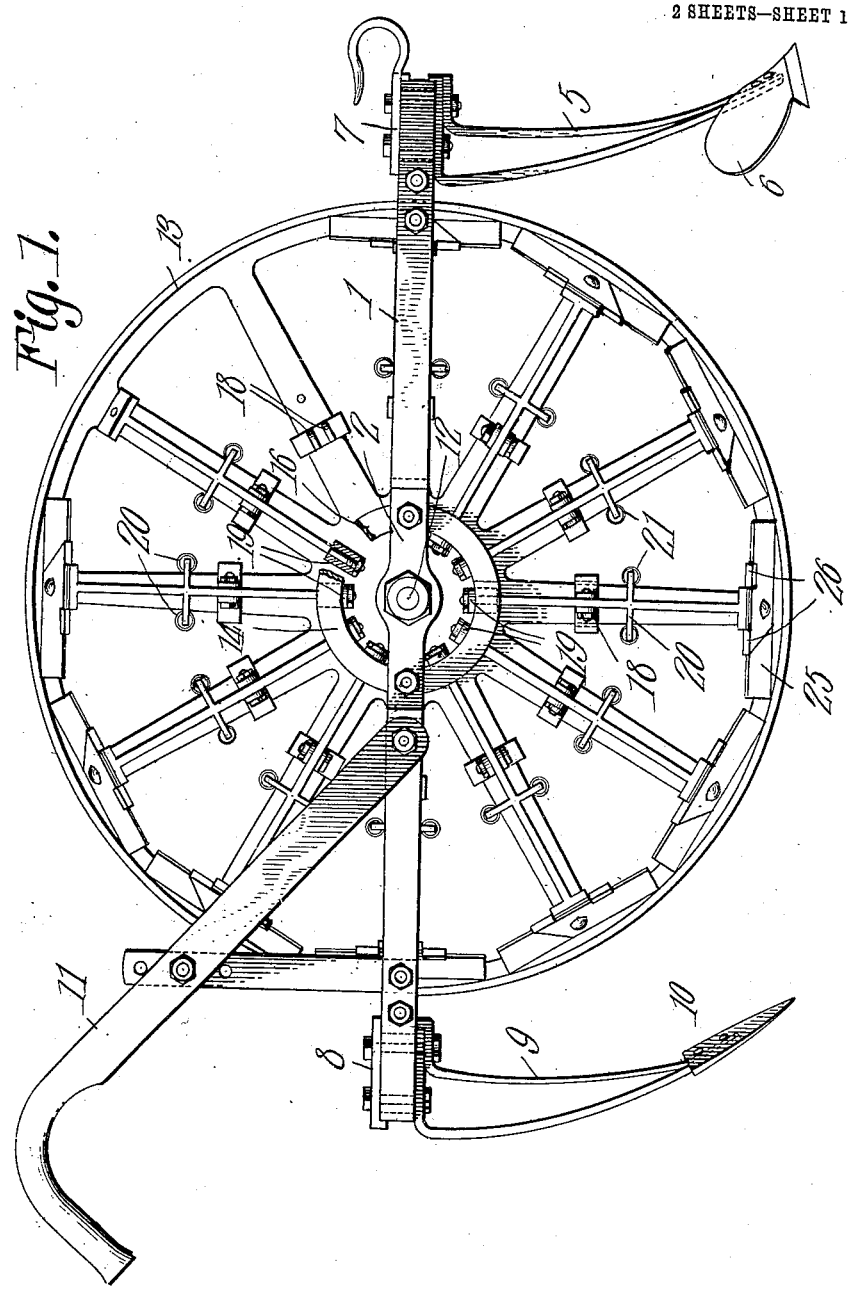
WITNESSES:
Thomas B. Catlett,
INVENTOR.
By C.A.Snow & Co.
ATTORNEYS No. 890,260. PATENTED JUNE 9, 1908.
T. B. CATLETT.
COTTON CHOPPER.
APPLICATION FILED MAY 20, 1907.
2 SHEETS—SHEET 2.
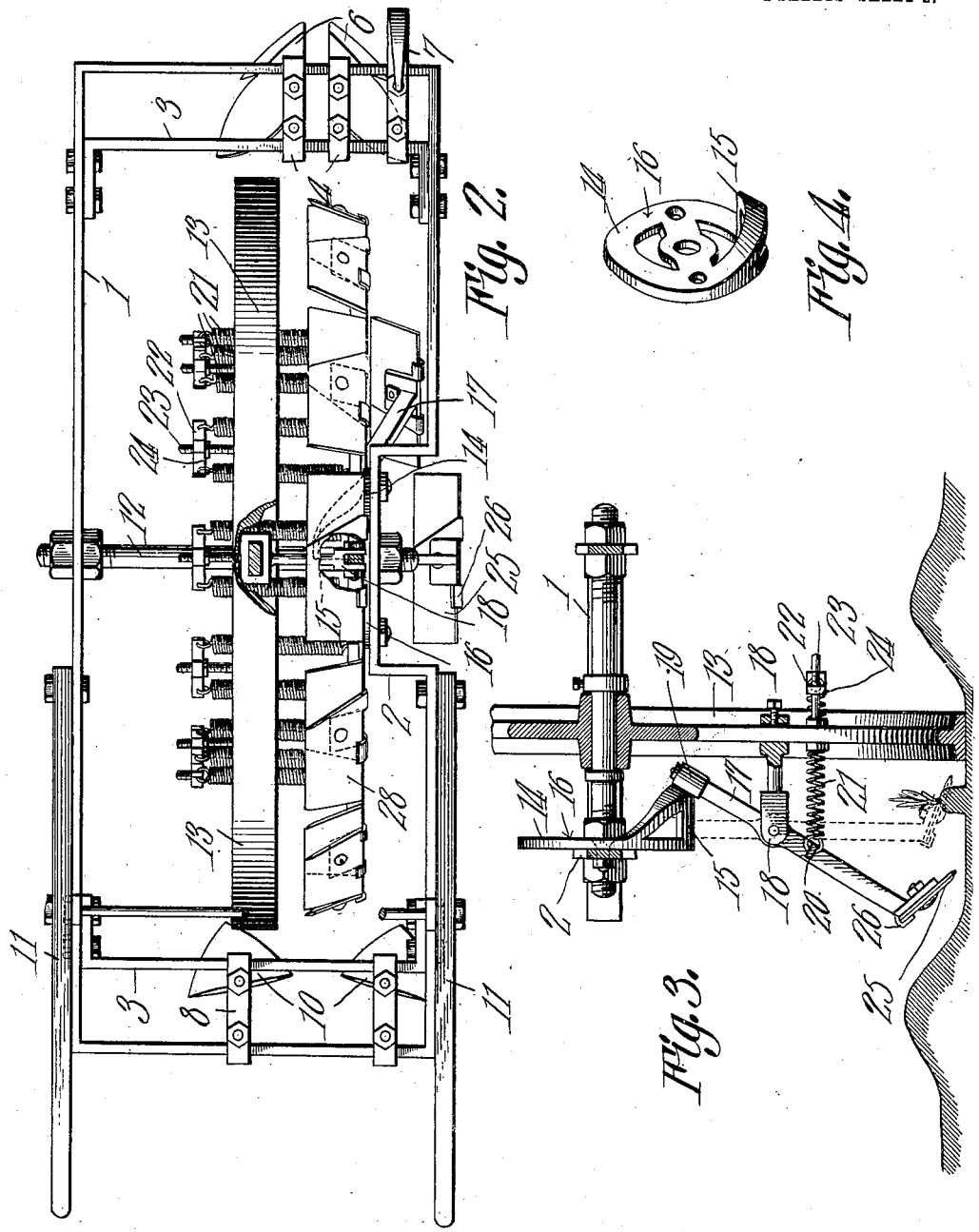
WITNESSES:
Thomas B. Catlett,
INVENTOR.
By C.A. Snow & Co.
ATTORNEYS

UNITED STATES PATENT OFFICE.

THOMAS B. CATLETT, OF FARMINGTON, ILLINOIS.

COTTON-CHOPPER.

No. 890,260.  Specification of Letters Patent.  Patented June 9, 1908.

Application filed May 20, 1907. Serial No. 374,697.

*To all whom it may concern:*

Be it known that I, THOMAS B. CATLETT, a citizen of the United States, residing at Farmington, in the county of Fulton and State of Illinois, have invented a new and useful Cotton-Chopper, of which the following is a specification.

This invention has relation to cotton choppers and it consists in the novel construction and arrangement of its parts as hereinafter shown and described.

The object of the invention is to provide a cotton chopper consisting of a frame supported upon a wheel and having a disk mounted thereon concentric with the wheel said disk having a volute portion and a plane portion. A series of hoes is attached to the wheel and each hoe is provided with a staff which is pivotally mounted upon one of the spokes of the wheel and which is provided at one end with a friction roller which operates against the face of the aforesaid disk. Blade sections are attached to the opposite end of the hoe staff and are adapted to move in a transverse direction with relation to the wheel in cutting out the superfluous plant in the row. The blades are moved away from the wheel through the co-action of the rotary movement of the wheel, the roller end of the hoe staff and the disk and are moved toward the wheel by coil springs, the tension of which is augmented by the outward movement of the said blades. The blade sections are of special construction as will hereinafter appear. Furrow openers and listers are adjustably attached to the frame of the chopper and an adjustable clevis is provided which may be so applied to the frame that the draft animal may travel at either side of the road as desired.

In the accompanying drawing:—Figure 1 is a side elevation of the chopper with parts removed and parts broken away. Fig. 2 is a top plan view of the chopper with parts broken away. Fig. 3 is a transverse sectional view of the lower portion of the chopper, and Fig. 4 is a perspective view of a disk used upon the chopper.

The chopper consists of the frame 1 which is substantially rectangular in plan and one side of which is provided with an indent 2. The opposite end portion of the frame is provided with the cross bars 3 which are parallel with the ends of the frame. The laterally adjustable clamps 4 are applied to the forward end of the frame and the forward cross bar 3. The plow standards 5 are attached to clamps 4 and the furrow openers 6 are carried by the standards 5. The adjustable clevis 7 is also applied to the forward end of the plane and the forward cross bar 3. The adjustable clamps 8 are applied to the rear end of the frame 1 and the rear cross bar 3. The standards 9 are attached to the clamps 8 and the listers 10 are carried by the standard 9. The frame 1 is provided with suitable handles 11. The axle 12 extends transversely across the frame and is fixed at one end to the indent 2 thereof and at its opposite end to the opposite side of the frame. The wheel 13 is journaled upon the axle 12. The disk 14 is mounted upon the inner side of the indent 2 and is provided with the volute portion 15 and the plane portion 16. The said disk is concentric with the wheel 13. The hoe staffs 17 are pivoted in the clips 18 which are mounted upon the spokes of the wheel 13 and the inner ends of the staffs 17 are provided with friction rollers 19 which operate against the inner face of the disk 14. At points between the clips 18 and the periphery of the wheel 13 the staffs 17 are provided with cruciform arms 20 which project substantially parallel with the plane of the wheel beyond the sides of the adjacent spokes. The coil springs 21 are attached to the ends of the arms 20 and extend transversely of the wheel 13 and are attached to a bar 22. Each said bar is provided with an intermediate perforation which receives the end of a pin 23. Said pin is screw threaded and the nut 24 engages the said thread and bears against the inner side of the bar 22 and may be moved longitudinally of the pin in order to adjust the tension of the springs 21. The said pins 23 are attached to the spokes of the wheel 13. The blade sections 25 are applied to the outer end of the staffs 17 and each section is provided with a flange 26 which overlaps the edge of the adjacent section. The said blade sections are of the same dimensions and configurations.

From the foregoing description it is obvious that as the implement is drawn along a row of plants the plows 6 will remove the earth at the sides of the row and one of the said plows will make a path in which the wheel 13 will travel. As the wheel 13 rotates and the hoes are approaching the ground the friction rollers 19 carried by the inner ends of the staffs 17 will ride upon the volute portion 15 of the disk 14 and the inner ends of the staffs are carried toward the wheel 13 and the outer ends are moved away from the same. When the hoe staff is in alinement with the vertical diameter of the wheel 13 the friction roller 19 passes beyond the end of the volute portion 15 and the tension of the springs 21 comes into play and brings the outer end of the hoe staff and the attached blade section toward the wheel with a positive lateral movement. Thus the blade sections are moved transversely of the row of plants and cut out the superfluous growth. Those plants that occur between the blade sections of the adjacent staffs remain standing in the row. The listers 10 following behind the wheel 13 may be directed to throw the earth toward the row or away from the same as desired.

Having described my invention what I claim as new and desire to secure by Letters-Patent is:—

A chopper comprising a wheel journaled in a frame, a stationary volute disk mounted upon the frame, concentric with the wheel, a series of hoes pivoted upon the spokes of the wheel and operatively engaging the disk, springs attached to the hoes and extending transversely through the wheel, and means located upon the opposite side of the wheel from the hoes for adjusting the tension of the springs.

In testimony that I claim the foregoing as my own, I have hereto affixed my signature in the presence of two witnesses.

THOMAS B. CATLETT.

Witnesses:
  GATE POTTER,
  GEORGE ROSS.